United States Patent
Kossovsky et al.

(10) Patent No.: US 8,936,388 B2
(45) Date of Patent: Jan. 20, 2015

(54) DISPOSABLE BEVERAGE CUP

(71) Applicants: Shay Kossovsky, Jerusalem (IL); Ori Hershkovitz, Tel-Aviv (IL)

(72) Inventors: Shay Kossovsky, Jerusalem (IL); Ori Hershkovitz, Tel-Aviv (IL)

( * ) Notice: Subject to any disclaimer, the term of this patent is extended or adjusted under 35 U.S.C. 154(b) by 198 days.

(21) Appl. No.: 13/792,254

(22) Filed: Mar. 11, 2013

(65) Prior Publication Data
US 2014/0254304 A1 Sep. 11, 2014

(51) Int. Cl.
*A47J 43/27* (2006.01)

(52) U.S. Cl.
CPC ........................................ *A47J 43/27* (2013.01)
USPC ............................. 366/130; 366/275; 366/276

(58) Field of Classification Search
CPC ........................................................ A47J 43/27
USPC .................... 366/129, 130, 275, 276
See application file for complete search history.

(56) References Cited

U.S. PATENT DOCUMENTS

| | | | | |
|---|---|---|---|---|
| 1,495,412 A | * | 5/1924 | Hoffner | 366/197 |
| 2,962,201 A | * | 11/1960 | Brillis et al. | 229/400 |
| 2,965,274 A | * | 12/1960 | Brillis et al. | 229/400 |
| 3,138,371 A | * | 6/1964 | Feher et al. | 366/341 |
| 6,871,995 B2 | * | 3/2005 | Simba | 366/129 |
| 7,717,610 B2 | * | 5/2010 | Schlebach | 366/130 |
| 8,172,452 B2 | * | 5/2012 | Bacon et al. | 366/130 |
| 8,444,047 B2 | * | 5/2013 | Edvardsson | 229/400 |

FOREIGN PATENT DOCUMENTS

WO  WO2011031318  3/2011

* cited by examiner

*Primary Examiner* — David Sorkin
(74) *Attorney, Agent, or Firm* — Mark M. Friedman

(57) ABSTRACT

A disposable beverage cup, comprising: a wall, in a form of a rolled foil; a bottom; and a mixing device made of substantially the same material as the wall, the mixing device comprising: an adherent strip adhered at a relatively low portion of the wall; a movable flap, extending from the adherent strip, for mixing a beverage; and a tab, extending from the flap substantially to a top of the cup, for moving said flap, wherein a mixing capability of the movable flap disposed at a low portion of the cup is significantly larger than a mixing capability other portions of said mixing device, thereby without tearing the mixing device, mixing substantially the bottom only of the beverage, thereby not splashing thereof.

17 Claims, 9 Drawing Sheets

DISPOSABLE BEVERAGE CUP

FIELD OF THE INVENTION

The present invention relates to the field of beverage drinking facilities. More particularly, the invention relates to a disposable beverage cup having an integrated mixing device.

BACKGROUND OF THE INVENTION

According to worldwide surveys, there is an increasing trend in using disposable cups. The annual consumption of disposable cups in the USA stands at 23 billion. In addition, 65% of the Americans use a sweetener in their beverages.

A common means of mixing beverages in a disposable cup is a mixing device. The mixing device is also disposable. Common mixing devices are usually made of plastic, or from wood. The annual consumption of disposable mixing devices in the USA during 2010 was 15 billion devices.

The tremendous use of mixing devices not only represents consumption of raw materials, but also environmental pollution.

It is an object of the present invention to provide a solution to the above-mentioned and other problems of the prior art.

It may be noted that one of the advantages of spoons as mixing devices, being the challenge of the present invention, is of the mixing of the bottom of the beverage, for not splashing the beverage above the rim of the cup.

Other objects and advantages of the invention will become apparent as the description proceeds.

SUMMARY OF THE INVENTION

In one aspect, the present invention is directed to a disposable beverage cup (10), comprising:
  a wall (14), in a form of a rolled foil; a bottom (20); and a mixing device (32) made of substantially the same material as the wall (14), the mixing device (32) comprising:
    an adherent strip (12) adhered at a relatively low portion of the wall (14);
    a movable flap (16), extending from the adherent strip (12), for mixing a beverage; and
    a tab (18), extending from the flap (16) substantially to a top of the cup (10), for moving said flap (16),
  wherein a mixing capability of the movable flap (16) disposed at a low portion of the cup is significantly larger than a mixing capability other portions of said mixing device (32), thereby without tearing the mixing device (32), mixing substantially the bottom only of the beverage, thereby not splashing thereof.

According to one embodiment, the movable flap (16) contacts the wall (14) once not applying manual force thereon, thereby upon applying vertical motion to the tab (18), drawing the movable flap (16) away from the wall (14).

According to another embodiment, a first portion (46) of the movable flap (16) contacts the bottom (20) of the cup (10) once not applying manual force thereon, thereby upon applying vertical motion to the tab (18), drawing the movable flap (16) away from the bottom (20).

The movable flap (16) may comprise:
  a first portion (46) extending from the adherent strip (12) along the bottom (20) of the cup (10).

The movable flap (16) may further comprise:
  a second portion (48) extending from the first portion (46) of the movable flap (16) along the bottom (20) of the cup.

The movable flap (16) may further comprise:
  a third portion (50) extending vertically from the second portion (48) of the movable flap (16), upwards towards the tab (18),
thereby the movable flap (16) allows horizontal motion (24) thereon, thereby providing a conventional spoon motion.

According to one embodiment, the first portion (46) and second portion (48) of the movable flap (16) may form an arc shape along the bottom (20) of the cup, thereby increasing maneuver of the flap (16).

According to another embodiment, the first portion (46) and second portion (48) of the movable flap (16) are separated by a first folding line (28), for allowing folding the first and second portion one in relation to the other.

The first portion (46) of the movable flap (16) may comprise two parallel portions (46) extending from the adherent strip (12), being separated by the second portion (48) of the movable flap (16).

The adherent strip (12) and the flap (16) may be separated by a second folding line (22), thereby the movability of the flap (16) may comprise folding the flap (16) about the second folding line (22), in relation to the adherent strip (12).

The second folding line (22) may be disposed horizontally, thereby the movable flap (16) is movable horizontally (24).

The tab (18) and the flap (16) may be separated by a third folding line (34), thereby the movability of the flap (16) may comprise folding the flap (16) about the second folding line (34), in relation to the tab (18).

The tab (18) may be relatively rigid, thereby allowing pushing the flap (16) downwards, upon pressing the tab (18) downwards.

The disposable beverage cup (10) may further comprise:
  a disposable cover (40) allowing the mixing while covering the disposable beverage cup (10).

The disposable cover (40) may comprise a hole (42) for threading the tab (18) therethrough.

The width of the flap (16) and of the tab (18) is sufficiently small for interlacing one cup (10) into another, thereby providing compact storage.

The tab (18) may be disposed above a top rim (30) of the cup (10), thereby allowing covering the cup (10) with a cover (40) and threading the tab (18) through the cover (40).

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF THE DRAWINGS

Preferred embodiments, features, aspects and advantages of the present invention are described herein in conjunction with the following drawings.

It should be understood that the drawings are not necessarily drawn to scale.

DETAILED DESCRIPTION OF THE INVENTION

The present invention will be understood from the following detailed description of preferred embodiments ("best mode"), which are meant to be descriptive and not limiting. For the sake of brevity, some well-known features, methods, systems, procedures, components, circuits, and so on, are not described in detail.

The present invention deals with the above-mentioned problems by providing a disposable beverage cup having an integrated mixing device. The mixing device is made of the same foil as the wall of the cup.

Figure 1:
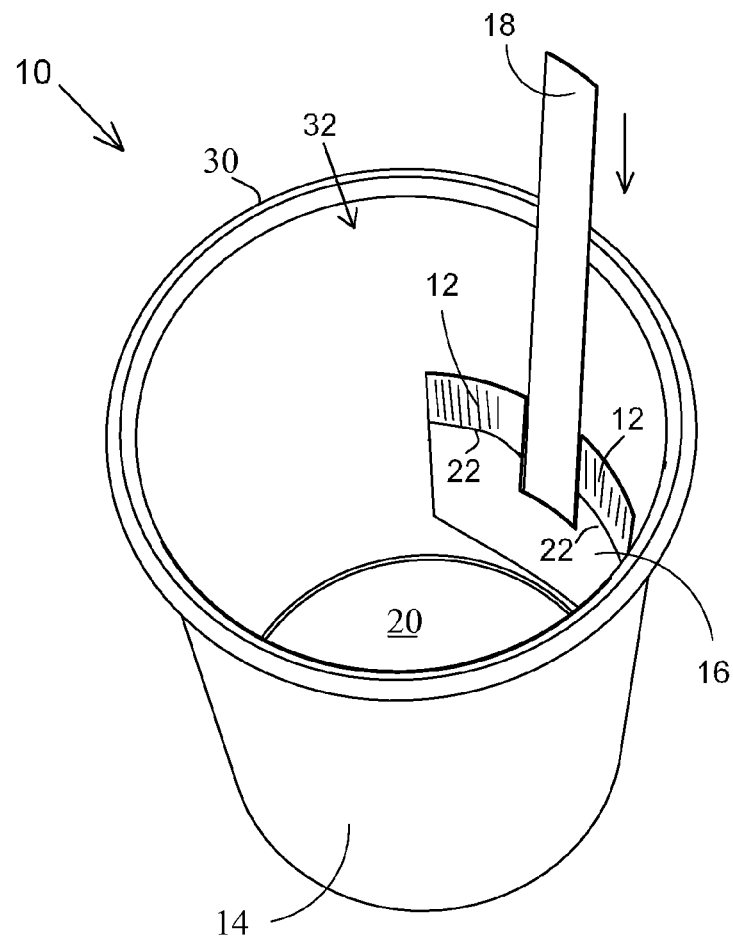
FIG. 1 schematically illustrates a disposable beverage cup having an integrated vertical mixing device, according to one embodiment of the invention.

FIG. 1 schematically illustrates a disposable beverage cup having an integrated vertical mixing device, according to one embodiment of the invention.

The disposable beverage cup is marked herein by reference numeral 10. It consists of a rolled foil 14.

The term "adhere" refers herein to adhering, to adhesion including mechanical adhesion, chemical adhesion, or other.

Foil 14 is adhered to a bottom 20. The adherent strip ends with a folding line 22.

A region of the foil 14 ending with folding line 22 is a flap, marked herein by reference numeral 16. Flap 16 is used for mixing the beverage, as further detailed herein.

Flap 16 is not adhered to foil 14, and more particularly, it is connected to wall 14 along folding line 22.

Tab 18 outstands from the upper rim 30 of the cup. Tab 18 is used to hold flap 16 while shaking flap 16 about folding line 22, in order to mix the beverage in the cup.

Thus, according to this embodiment, flap 16 together with tab 18 constitutes a mixing device 32.

According to a preferred embodiment, even though tab 18 extends above the top rim 30 of the cup, only a bottom portion being flap 16 substantially can mix the beverage, since flap 16 is disposed substantially at the bottom.

The user holds tab 18, and shakes flap 16 vertically up and down, by folding it about folding line 22. The arrow denotes the vertical shaking movement of flap 16 constituting the mixing device 32. As a result, the mixing device 32 mixes the beverage of the cup.

Disposable beverage cup 10 includes the bottom 20 and rolled foil 14 being the wall of cup 10. Foil 14 is also adhered to the bottom 20 of the cup.

Mixing device 32 is made of substantially the same material as of foil 14. Mixing device 32 includes an adherent strip 12 adhered relatively low to the inner side of the rolled foil 14, being the wall of the cup. The bottom of adherent strip 12 ends with flap 16, being naturally in contact to wall 14 of the cup, as shown in FIG. 1, wherein naturally means that i.e., without moving tab 18, and without applying manual force thereon.

However, flap 16 is foldable in relation to wall 14 and to strip 12, by a folding line 22. The natural state, being the down state, as shown by the arrow, is obtained by gravity, and/or by springy characteristic, and/or by pushing downwards.

Thus, according to this embodiment, flap 16 of mixing device 32 is disposed substantially at the bottom of the cup, for mixing the bottom of the beverage. The mixing is performed by lifting tab 18, which lifts flap 16, thus moving flap 16 about folding line 22, and then lowering flap 16. This embodiment of mixing the bottom of the beverage is advantaged of not raising the beverage above the rim 30 of the cup, thus avoiding splashing the beverage out of the cup.

Figure 2:
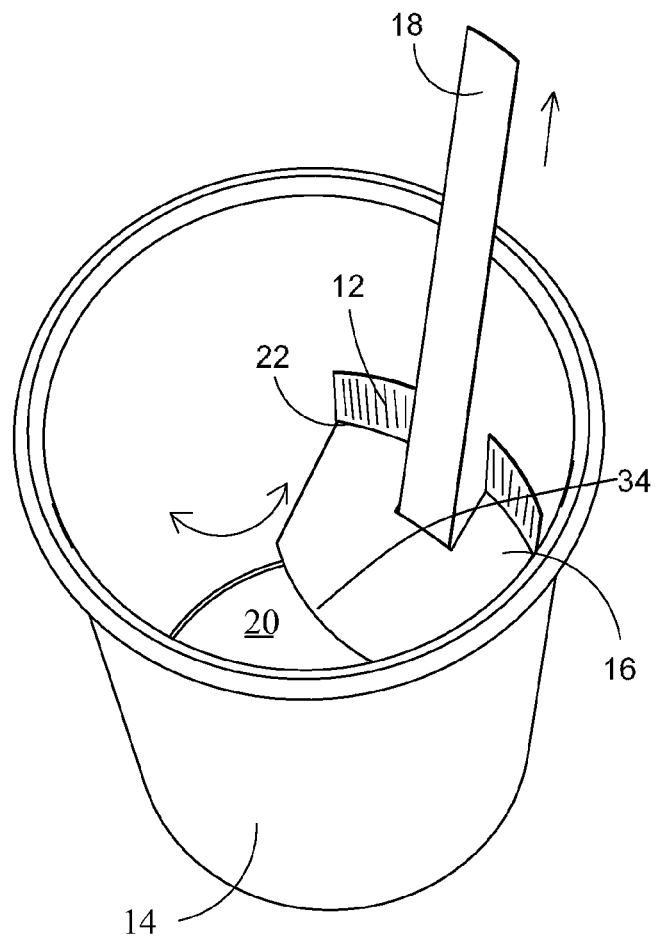
FIG. 2 schematically illustrates the operation of the integrated vertical mixing device of FIG. 1.

FIG. 2 schematically illustrates the operation of the integrated vertical mixing device of FIG. 1.

Tab 18 extends from above the rim 30 of the cup down to the flap 16 disposed at the bottom of the cup. The user holds tab 18, and shakes flap 16 vertically up and down, by folding it about folding line 22. The arrow in the figure denotes the vertical shaking movement of flap 16. As a result, flap 16 mixes the beverage within the cup.

Upon folding flap 16 about folding line 22 in relation to adherent strip 12, folding flap 16 also folds about tab 18, preferably about a folding line 34.

Tab 18 preferably is rigid enough for allowing pushing flap 16 downwards, upon pressing tab 18 downwards.

Figure 3:
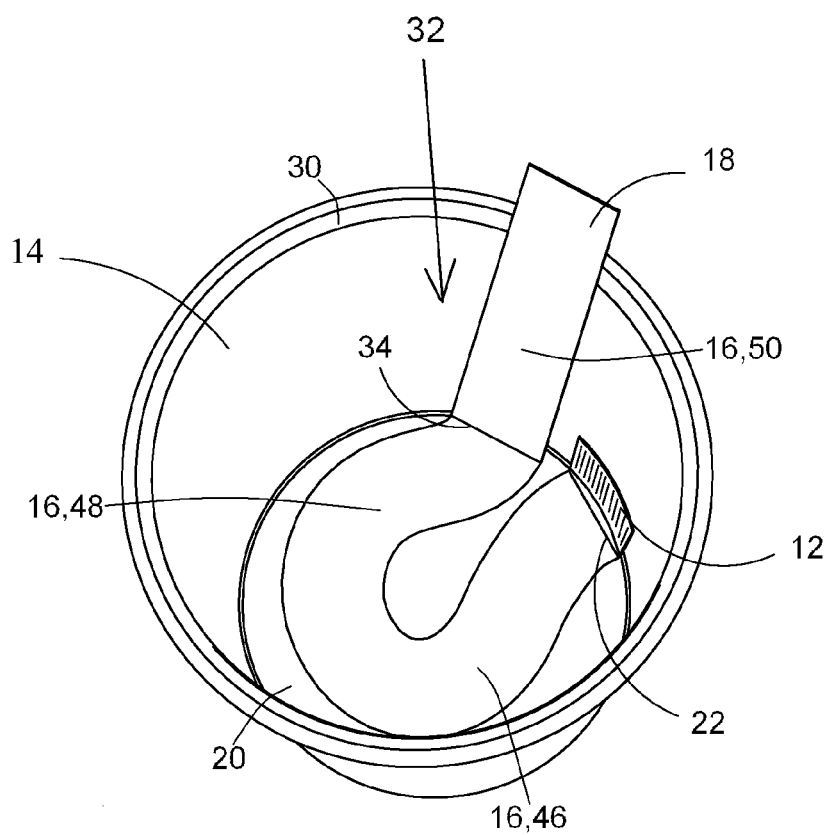
FIG. 3 is a top perspective view of a disposable beverage cup having an integrated vertical and horizontal mixing device, according to one embodiment of the invention.

FIG. 3 is a top perspective view of a disposable beverage cup having an integrated vertical and horizontal mixing device, according to one embodiment of the invention.

According to the embodiment of FIG. 3, adherent strip 12 of mixing device 32 is adhered to the inner side of the wall 14, at the bottom thereof. The bottom of adherent strip 12 ends with flap 16, being foldable in relation to wall 14 and to strip 12, by a folding line 22.

Flap 16, rather than the embodiment of FIG. 1, being naturally disposed, in contact to wall 14 of the cup, extends from folding line 22 disposed at the bottom of wall 14, to naturally contact bottom 20 of the cup, at a portion enumerated 46 of flap 16. Portion 46 of flap 16 extends substantially from wall to wall along bottom 20. A portion 48 of flap 16 extends substantially back to the first wall along bottom 20. Portions 46 and 48 of flap 16 constitute a single continuous portion, as only the shaping of flap 16 forms the extensions along bottom 20. Flap 16 further extends from horizontal portion 48 to a vertical portion 50 ending with tab 18, disposed above rim 30 of the cup.

Portion 48 of flap 16 along bottom 20 may preferably be shaped as an arc, as shown in FIG. 3, for increasing the maneuver of using flap 16.

Flap 16 of mixing device 32 is disposed at the bottom of the cup, for mixing the bottom of the beverage. This embodiment of mixing the bottom of the beverage is advantaged of not raising the beverage above the rim 30 of the cup, thus avoiding splashing the beverage out of the cup.

In addition, flap 16 extends along the bottom 20 of the cup, and from there along wall 14, for allowing also horizontal motion, like a conventional spoon.

Figure 4:
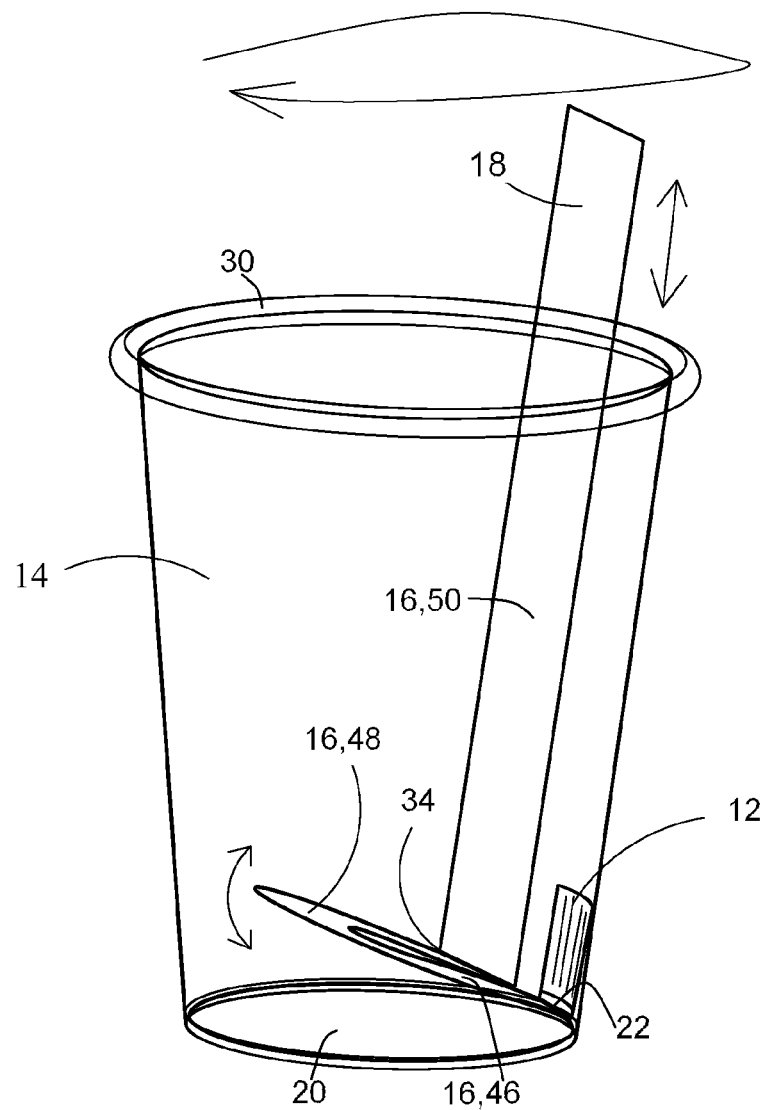
FIG. 4 is a front sectional view of the disposable beverage cup having the integrated vertical and horizontal mixing device of FIG. 3.

FIG. 4 is a front sectional view of the disposable beverage cup having the integrated vertical and horizontal mixing device of FIG. 3.

Tab 18 extends from above the rim 30 of the cup down to the flap 16. Flap 16 extends from below rim 30, down to the bottom 20 of the cup, and further along bottom 20 to strip 12 adhered to the bottom portion of wall 14.

Flap 16 includes vertical portion 50 extending from below rim 30, down to the bottom 20 of the cup. The further portion 48 of flap 16 along bottom 20 is horizontal, and thus a folding line 34 may separate between the vertical portion 50 and the horizontal portion 48 of flap 16. And, folding line 22 separates between the horizontal portion 46 of flap 16, and the strip 12, being disposed vertically, since it is adhered to wall 14.

The user holds tab 18, and may push and pull horizontal portion 48 flap 16 vertically up and down, via vertical portion 50 thereof, by folding horizontal portion 46 about folding line 22. In addition, the user may hold tab 18, and rotate it, for rotating vertical portion 50 of flap 16 horizontally like a conventional spoon.

Figure 5:
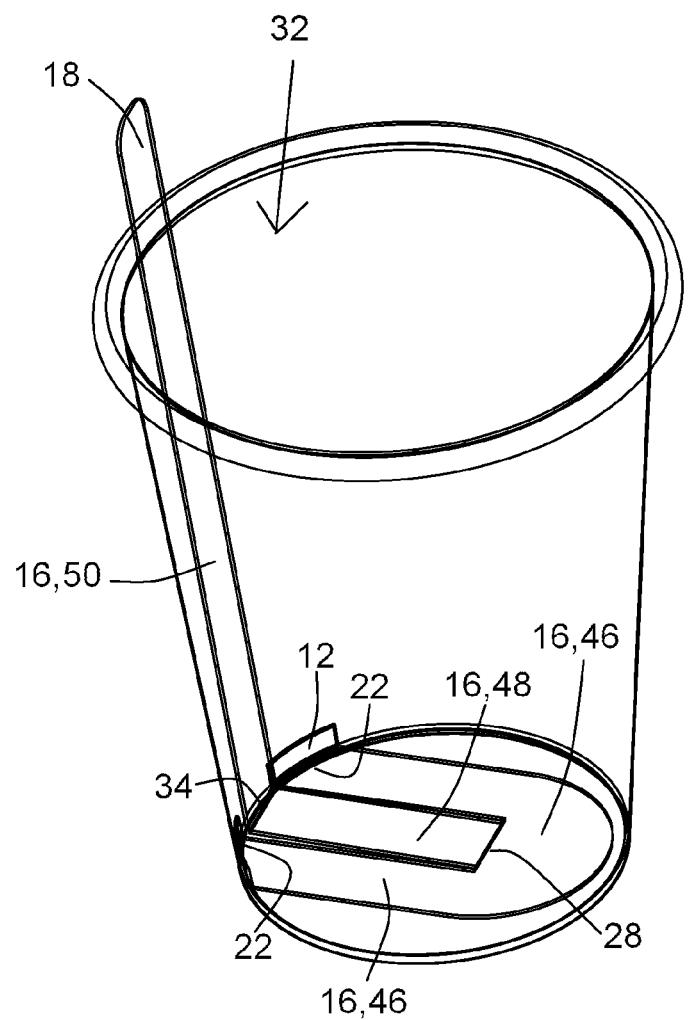
FIG. 5 is a top perspective view of a disposable beverage cup having an integrated vertical and horizontal mixing device, according to another embodiment of the invention.

FIG. 5 is a top perspective view of a disposable beverage cup having an integrated vertical and horizontal mixing device, according to another embodiment of the invention.

According to the embodiment of FIG. 5, adherent strip 12 of mixing device 32 is adhered to the inner side of the wall 14, at the most bottom thereof. The bottom of adherent strip 12 ends with portion 46 of flap 16, being foldable in relation to wall 14 and to strip 12, by folding line 22.

Portion 46 of flap 16, like the embodiment of FIG. 3, naturally contacts bottom 20 of the cup, at a portion enumerated 46 of flap 16. Portion 46 of flap 16 extends substantially from wall to wall along bottom 20. Portion 48 of flap 16 extends substantially back to the first wall along bottom 20.

In contrast to the embodiment of FIG. 3, wherein portions 46 and 48 of flap 16 constitute a single continuous portion, portions 46 and 48 are separated by a folding line 28. Flap 16 further extends from horizontal portion 48 to vertical portion 50, ending with tab 18, disposed above rim 30 of the cup.

In contrast to the relatively free form of flap 16 of FIG. 3, two parallel portions 46 extend from two adherent strips 12, and portion 48 is disposed in the middle between the two parallel portions 46, thus forming a well-determined shape of flap 16.

Like FIG. 3, flap 16 here as well is disposed at the bottom of the cup, for mixing the bottom of the beverage. This embodiment of mixing the bottom of the beverage is advantaged of not raising the beverage above the rim 30 of the cup, thus avoiding splashing the beverage out of the cup.

Like FIG. 3, flap 16 here as well extends along the bottom 20 of the cup, and from there along wall 14, for allowing also horizontal motion, like a conventional spoon.

Figure 6:
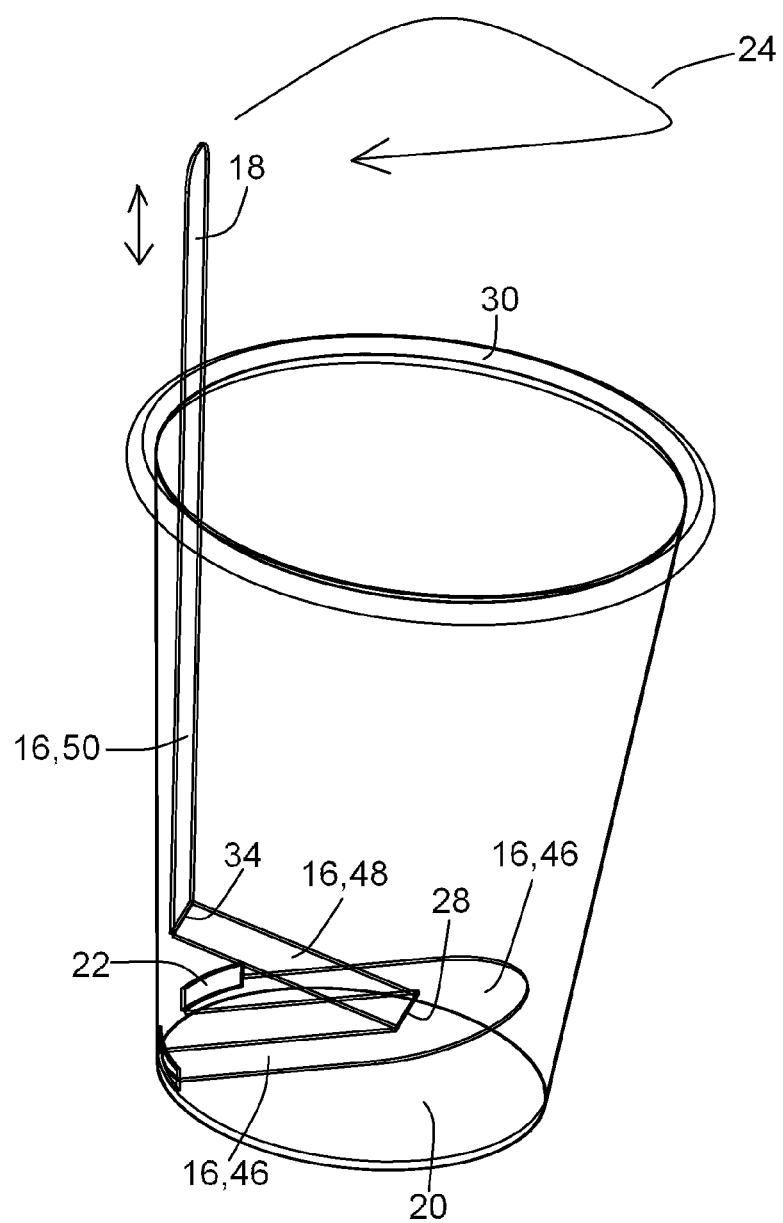
FIG. 6 is a front sectional view of the disposable beverage cup having the integrated vertical and horizontal mixing device of FIG. 5.

FIG. 6 is a front sectional view of the disposable beverage cup having the integrated vertical and horizontal mixing device of FIG. 5.

Tab 18 extends from above the rim 30 of the cup down to flap 16. Flap 16 extends from below rim 30, down to the bottom 20 of the cup, and further along bottom 20 to strips 12 adhered to the bottom portion of wall 14.

Flap 16 includes vertical portion 50 extending from below rim 30, down to a portion 48 of flap 16 along the bottom 20 of the cup. Portion 48 along bottom 20 is horizontal, and thus a folding line 34 may separate between the vertical portion 50 and the horizontal portion 48 of flap 16. A folding line 28 separates between horizontal portion 48 of flap 16 and horizontal portion 46 of flap 16. And, folding line 22 separates between the horizontal portion 46 of flap 16, and the strip 12, being disposed vertically, adhered to wall 14.

Portions 46 and 48 of flap 16, occupy a significant horizontal area, adjacent to bottom, and thus the user holding tab 18 is capable of efficiently mix the beverage by moving portions 46 and 48 of flap 16, up and down.

Flap 16 includes vertical portion 50 extending from below rim 30, down to the bottom 20 of the cup.

The user holds tab 18, and may push and pull horizontal portion 48 flap 16 vertically up and down, via vertical portion 50 thereof, by folding horizontal portion 46 about folding line 22. In addition, the user may hold tab 18, and rotate it, for rotating vertical portion 50 of flap 16 horizontally like a conventional spoon.

Figure 7:
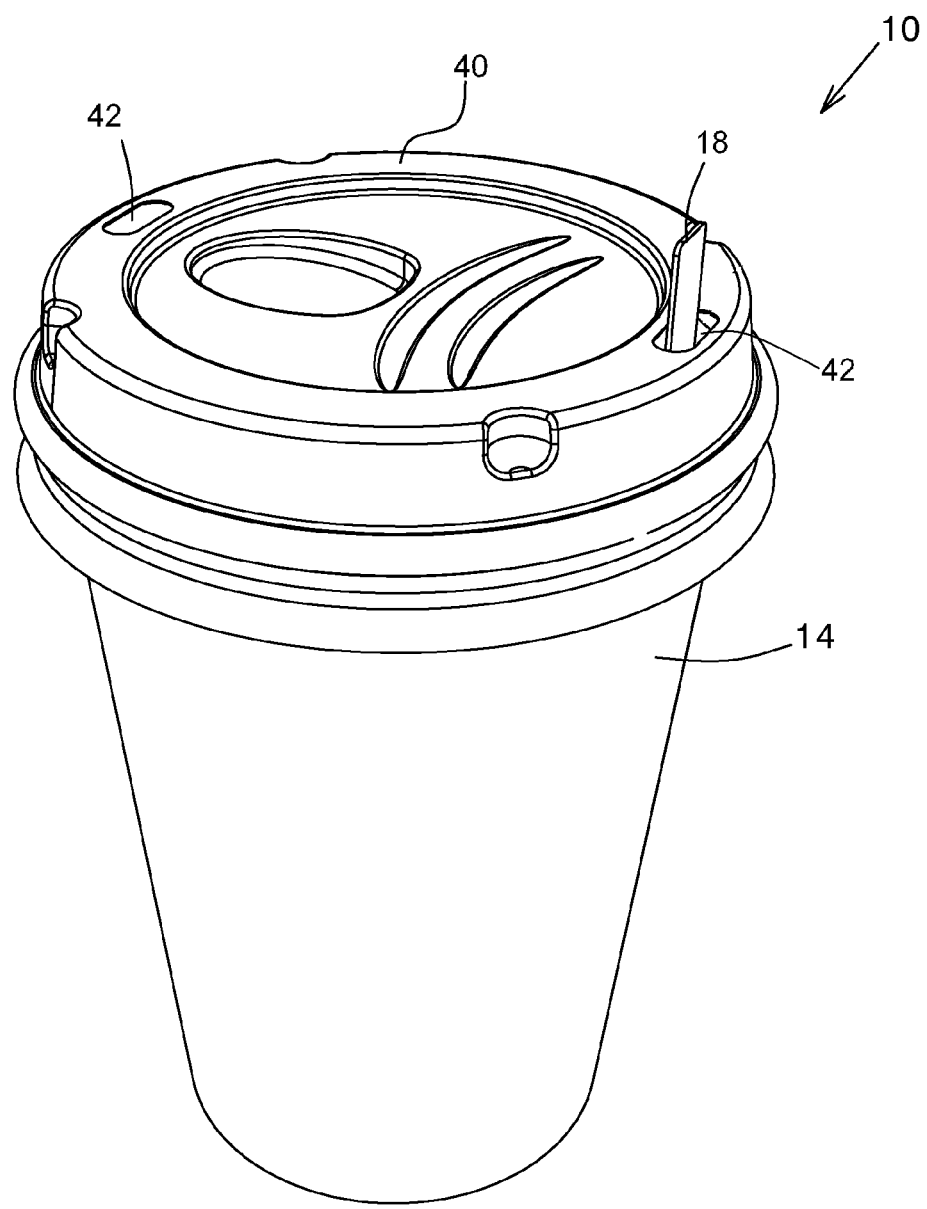
FIG. 7 depicts the disposable beverage cup having the mixing devices of FIGS. 1 to 6, including a cover to the cup.

FIG. 7 depicts the disposable beverage cup having the mixing devices of FIGS. 1 to 6, including a cover to the cup.

Cup 10 may be incorporated with a conventional disposable cover 40. Disposable cover 40 may include two small holes 42, one for functioning as an outlet, and the other for threading tab 18 of the mixing device 32.

Figure 8:
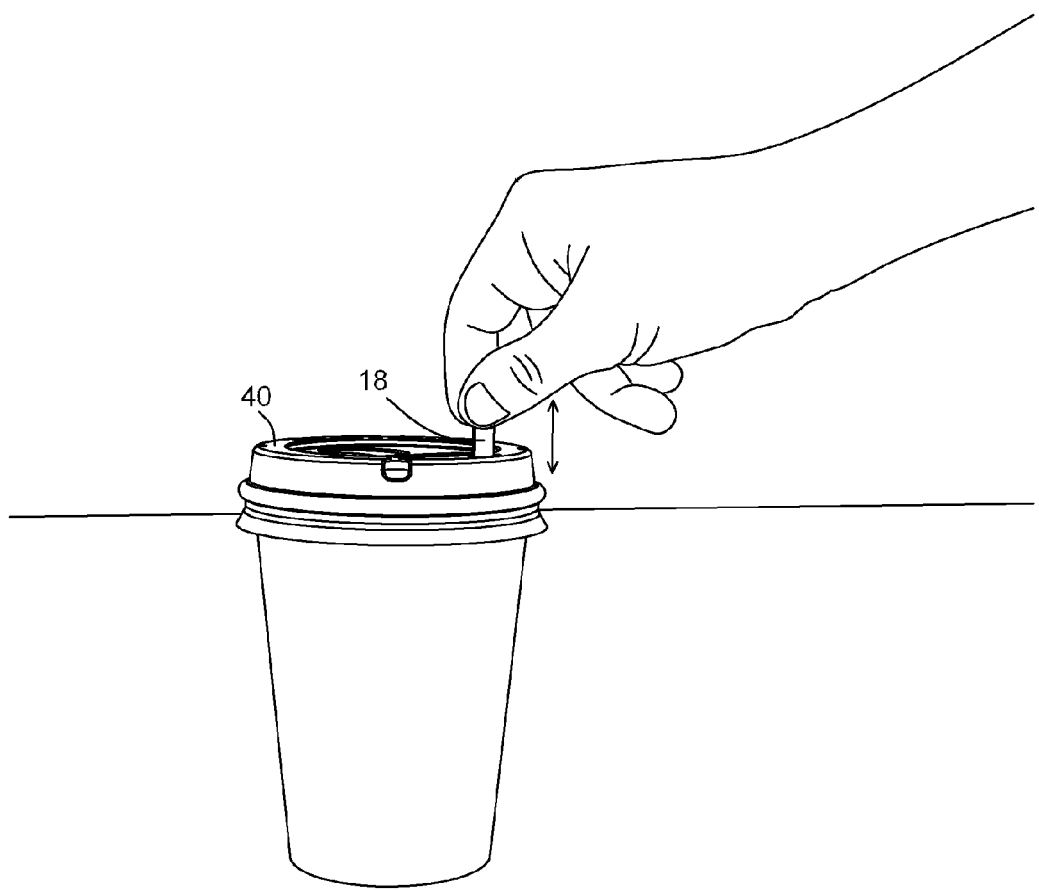
FIG. 8 depicts the mixing operation with the disposable beverage cup having any of the mixing devices of FIGS. 1 to 6, including the cover of FIG. 7.

FIG. 8 depicts the mixing operation with the disposable beverage cup having any of the mixing devices of FIGS. 1 to 6, including the cover of FIG. 7.

While mixing device 32 (shown only the tab 18) is threaded through hole 42 of cover 40, mixing device 32 allows vertical motion only.

Figure 9:
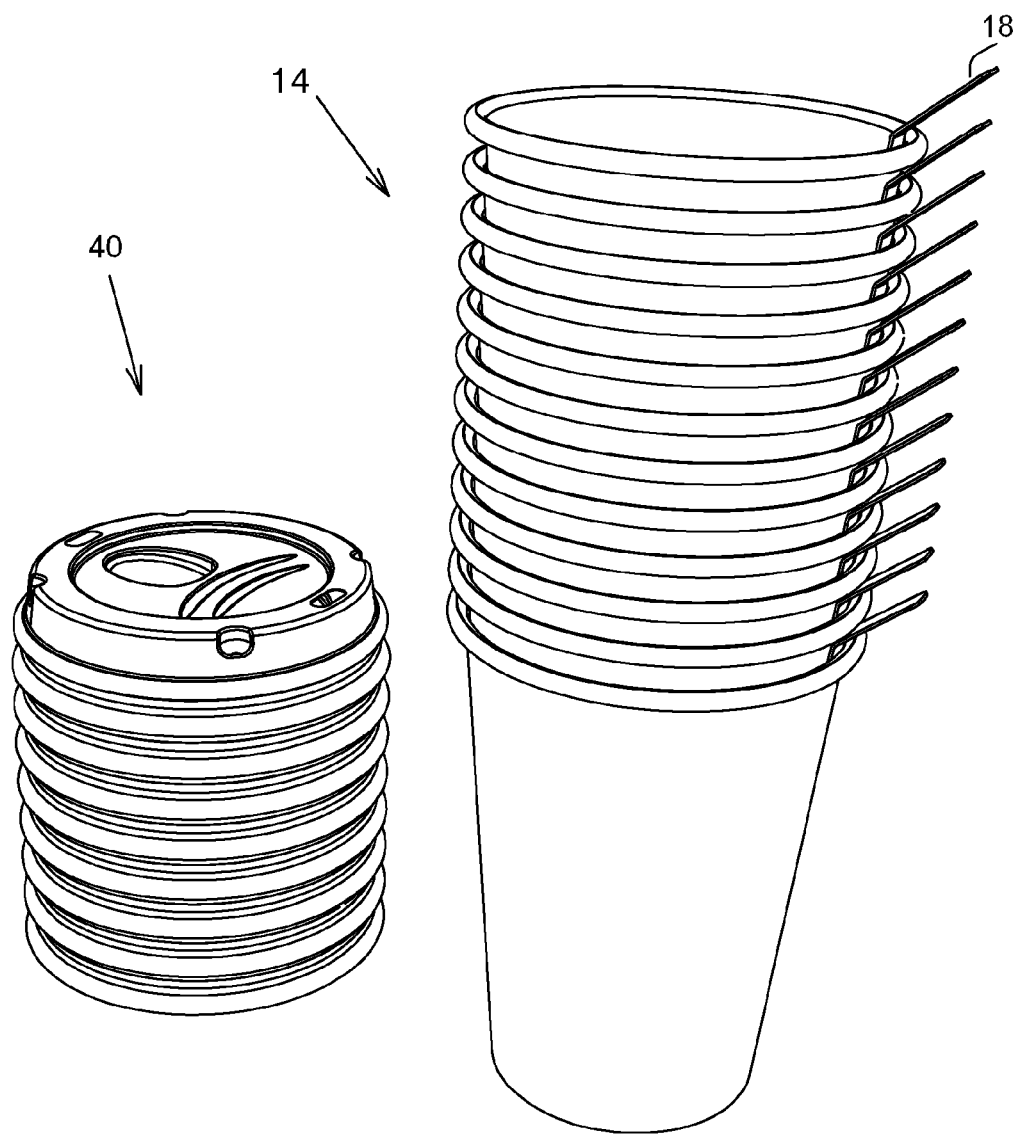
FIG. 9 schematically illustrates a plurality of disposable beverage cups and covers, according to one embodiment of the invention, each having an integrated mixing device.

FIG. 9 schematically illustrates a plurality of disposable beverage cups and covers, according to one embodiment of the invention, each having an integrated mixing device.

Flap 16 (hidden) ending with tab 18, constituting the mixing device 32 does disturb interlacing one cup 10 into the other, and interlace one cover 40 into the other providing compact storage.

In the figures and/or description herein, the following reference numerals (Reference Signs List) have been mentioned:

numeral 10 denotes a disposable beverage cup having an integrated mixing device, according to one embodiment of the invention;
numeral 12 denotes an adherent layer;
numeral 14 denotes a wall of cup 10;
numeral 16 denotes a flap that consists of a mixing device;
numeral 18 denotes a tab of flap 16;
numeral 20 denotes the bottom of cup 10;
numeral 22 denotes a folding line;
numeral 24 denotes horizontal steering direction;
numeral 28 denotes another folding line;
numeral 30 denotes the upper rim of cup 10;
numeral 32 denotes a mixing device, being an integrated element of the cup;
numeral 34 denotes a folding line between the vertical portion and the horizontal portion of the flap;
numeral 40 denotes a disposable cover of the cup;
numeral 42 denotes a hole of the cup cover;
numeral 34 denotes a folding line between the flap and the tab extending from the flap;
numeral 46 denotes a first portion of the movable flap being adjacent to the adherent strip 12 and being horizontal;
numeral 48 denotes a second portion of the movable flap, being adjacent to portion 50 and being horizontal; there is no real border between portions 46 and 48; and
numeral 50 denotes a third portion of the movable flap, being vertical.

In the description herein, the following references have been mentioned:

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A disposable beverage cup, comprising:
   a wall, in a form of a rolled foil; a bottom; and a mixing device made of substantially the same material as said wall, said mixing device comprising:
   an adherent strip adhered at a relatively low portion of said wall;
   a movable flap, extending from said adherent strip, for mixing a beverage; and
   a tab, extending from said flap substantially to a top of said cup, for moving said flap,
   wherein a mixing capability of said movable flap disposed at a low portion of the cup is significantly larger than a mixing capability other portions of said mixing device,
   thereby without tearing said mixing device, mixing substantially the bottom only of the beverage, thereby not splashing thereof.

2. A disposable beverage cup according to claim 1, wherein said movable flap contacts said wall once not applying manual force thereon,
   thereby upon applying vertical motion to said tab, drawing said movable flap away from said wall.

3. A disposable beverage cup according to claim 1, wherein a first portion of said movable flap contacts said bottom of the cup once not applying manual force thereon,
   thereby upon applying vertical motion to said tab, drawing said movable flap away from said bottom.

4. A disposable beverage cup according to claim 1, wherein said movable flap comprises:
   a first portion extending from said adherent strip along said bottom of the cup.

5. A disposable beverage cup according to claim 4, wherein said movable flap further comprises:
   a second portion extending from said first portion of said movable flap along said bottom of the cup.

6. A disposable beverage cup according to claim 5, wherein said movable flap further comprises:
   a third portion extending vertically from said second portion of said movable flap, upwards towards said tab,
   thereby said movable flap allows horizontal motion thereon,
   thereby providing a conventional spoon motion.

7. A disposable beverage cup according to claim 5, wherein said first portion and second portion of said movable flap form an arc shape along said bottom of the cup,
   thereby increasing maneuver of said flap.

8. A disposable beverage cup according to claim 5, wherein said first portion and second portion of said movable flap are separated by a first folding line, for allowing folding said first and second portion one in relation to the other.

9. A disposable beverage cup according to claim 5, wherein said first portion of said movable flap comprises two parallel portions extending from said adherent strip, being separated by said second portion of said movable flap.

10. A disposable beverage cup according to claim 1, wherein said adherent strip and said flap are separated by a second folding line, thereby the movability of said flap comprises folding said flap about said second folding line, in relation to said adherent strip.

11. A disposable beverage cup, according to claim 10, wherein said second folding line is disposed horizontally,
    thereby said movable flap is movable horizontally.

12. A disposable beverage cup according to claim 1, wherein said tab and said flap are separated by a third folding line, thereby the movability of said flap comprises folding said flap about said second folding line, in relation to said tab.

13. A disposable beverage cup according to claim 1, wherein said tab comprises rigidity,
    thereby allowing pushing said flap downwards, upon pressing said tab downwards.

14. A disposable beverage cup according to claim 1, further comprising:
    a disposable cover allowing said mixing while covering said disposable beverage cup.

15. A disposable beverage cup according to claim 14, wherein said disposable cover comprises a hole for threading said tab therethrough.

16. A disposable beverage cup according to claim 1, wherein a width of said flap and of said tab is sufficiently small for interlacing one cup into another,
    thereby providing compact storage.

17. A disposable beverage cup according to claim 1, wherein said tab is disposed above a top rim of said cup,
    thereby allowing covering said cup with a cover and threading said tab through said cover.

* * * * *